United States Patent
Narayanan et al.

(10) Patent No.: US 12,531,381 B2
(45) Date of Patent: Jan. 20, 2026

(54) TRANSCEIVER LIGHT PLUG

(71) Applicant: Dell Products L.P., Round Rock, TX (US)

(72) Inventors: Padmanabhan Narayanan, Chennai (IN); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 18/435,141

(22) Filed: Feb. 7, 2024

(65) Prior Publication Data
US 2025/0253596 A1    Aug. 7, 2025

(51) Int. Cl.
| | |
|---|---|
| *H01R 13/717* | (2006.01) |
| *H01R 13/502* | (2006.01) |
| *H01R 13/641* | (2006.01) |
| *H01R 13/66* | (2006.01) |
| *H04B 10/40* | (2013.01) |

(52) U.S. Cl.
CPC ....... *H01R 13/7175* (2013.01); *H01R 13/502* (2013.01); *H01R 13/641* (2013.01); *H01R 13/6683* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 7,936,671 B1 * | 5/2011 | Mater | ..................... | H04L 43/50 |
| | | | | 370/235 |
| 9,269,307 B1 * | 2/2016 | Aybay | .................. | G09G 3/3426 |
| 11,171,840 B2 * | 11/2021 | Shahabudeen | ...... | H04L 43/0811 |
| 11,191,173 B2 * | 11/2021 | Coffey | .................. | H01R 13/641 |
| 2005/0254756 A1 * | 11/2005 | Dunn | ..................... | G02B 6/421 |
| | | | | 385/88 |

(Continued)

OTHER PUBLICATIONS

M. Chow, "Dell Technologies—A Tale of Two Fabrics," https://infohub.delltechnologies.com/p/dell-technologies-a-tale-of-two-fabrics/, Sep. 13, 2022, 8 pages.

(Continued)

*Primary Examiner* — Fekadeselassie Girma
(74) *Attorney, Agent, or Firm* — Ryan, Mason & Lewis, LLP (57) ABSTRACT

An apparatus comprises one or more transceiver ports and at least one processing device comprising a processor coupled to a memory. The at least one processing device is configured to detect a transceiver light plug interconnected with a transceiver plugged into a given one of the transceiver ports, and to exchange, via a first set of connectors of the transceiver which are operably connected with a second set of connectors of the transceiver light plug, configuration information for light-based indicators arranged on a housing of the transceiver light plug. The at least one processing device is also configured to determine an operational status of the given transceiver port, and to provide, to the transceiver light plug via the first and second sets of connectors, control information for controlling operation of the light-based indicators based at least in part on the determined operational status of the given transceiver port.

20 Claims, 10 Drawing Sheets

(56) References Cited

U.S. PATENT DOCUMENTS

| | | | | | |
|---|---|---|---|---|---|
| 2007/0208981 | A1* | 9/2007 | Restrepo | ............. | H02H 1/0015 714/731 |
| 2008/0030362 | A1* | 2/2008 | Huang | ............... | H04L 43/0817 709/224 |
| 2008/0104275 | A1* | 5/2008 | Almeida | ............ | H04L 43/0811 709/243 |
| 2011/0043371 | A1* | 2/2011 | German | ............. | G06F 13/4282 340/815.45 |
| 2012/0196475 | A1* | 8/2012 | Lin | .................... | H01R 25/003 439/505 |
| 2014/0064721 | A1* | 3/2014 | Wang | ................. | H04B 10/038 398/139 |
| 2014/0156879 | A1* | 6/2014 | Wong | ................ | G06F 11/3055 710/19 |
| 2014/0298067 | A1* | 10/2014 | Reynov | ............... | G06F 11/325 713/324 |
| 2015/0016277 | A1* | 1/2015 | Smith | .................... | H04L 41/22 370/244 |
| 2017/0078021 | A1* | 3/2017 | Zhang | ............... | H04B 10/0731 |
| 2020/0186437 | A1* | 6/2020 | Shahabudeen | ...... | H04L 43/0811 |
| 2021/0288720 | A1* | 9/2021 | Li | ..................... | H04Q 11/0067 |
| 2022/0224618 | A1* | 7/2022 | Rathinasamy | ........ | H04L 7/0075 |
| 2023/0054668 | A1* | 2/2023 | Kuffel | ................. | G02B 6/3882 |
| 2023/0239051 | A1* | 7/2023 | Rao | ..................... | H04B 10/071 398/135 |
| 2024/0248116 | A1* | 7/2024 | Aagaard | ............. | H01R 13/641 |

OTHER PUBLICATIONS

Cumulus Networks, Inc., "Open Network Install Environment—Overview," https://opencomputeproject.github.io/onie/overview/index.html#onie-overview, Accessed Feb. 7, 2024, 9 pages.

Dell Technologies, "Dell Powerswitch Z9332F-ON," Specification Sheet, V2.3, Jun. 2022, 5 pages.

Github, "SONiC User Manual," https://github.com/sonic-net/SONiC/blob/master/doc/SONIC-User-Manual.md, Accessed Feb. 7, 2024, 21 pages.

* cited by examiner

TRANSCEIVER LIGHT PLUG

BACKGROUND

Computing devices, including network switches and other types of network devices, may include one or more transceiver ports for transceivers. Such transceivers may be used for interconnecting multiple computing devices. The transceiver ports may support a wide spectrum of data transfer speeds, enabling a range of connectivity options. The transceiver ports may be arranged on a housing of a computing device. For example, a front panel of a network switch may include a plurality of transceiver ports. One or more light-emitting diodes (LEDs) or other light-emitting diodes may be arranged on the housing of the computing device in order to provide various information relating to transceiver ports of the computing device.

SUMMARY

Illustrative embodiments of the present disclosure provide techniques for detection and control of light-based indicators of a transceiver light plug connected to a transceiver.

In one embodiment, an apparatus comprises one or more transceiver ports and at least one processing device comprising a processor coupled to a memory. The at least one processing device is configured to detect a transceiver light plug interconnected with a transceiver plugged into a given one of the one or more transceiver ports, and to exchange, via a first set of one or more connectors of the transceiver which are operably connected with a second set of one or more connectors of the transceiver light plug, configuration information for one or more light-based indicators arranged on a front panel of a housing of the transceiver light plug. The at least one processing device is also configured to determine an operational status of the given transceiver port, and to provide, to the transceiver light plug via the first and second sets of one or more connectors, control information for controlling operation of the one or more light-based indicators arranged on the front panel of the housing of the transceiver light plug, the control information being based at least in part on the determined operational status of the given transceiver port.

In another embodiment, an apparatus comprises a housing comprising a front panel and a rear panel opposite the front panel, one or more light-based indicators arranged on the front panel of the housing, and a first set of one or more connectors at the rear panel of the housing, the first set of one or more connectors being configured for operable interconnection with a second set of one or more connectors of a transceiver, the transceiver configured for insertion into a transceiver port of a computing device. The apparatus also comprises at least one processing device comprising a processor coupled to a memory, the at least one processing device being configured to exchange, with the computing device via the first and second sets of one or more connectors, configuration information for the one or more light-based indicators arranged on the front panel of the housing. The at least one processing device is also configured to receive, from the computing device via the first and second sets of one or more connectors, control information for controlling operation of the one or more light-based indicators arranged on the front panel of the housing, the control information being based at least in part on a determined operational status of the transceiver port of the computing device. The at least one processing device is further configured to control operation of the one or more light-based indicators arranged on the front panel of the housing based at least in part on the received control information.

In another embodiment, an apparatus comprises a transceiver configured for insertion into a transceiver port of a computing device and a tab coupled to the transceiver, the tab comprising a first set of one or more connectors, the first set of one or more connectors being configured for operable interconnection with a second set of one or more connectors of a transceiver light plug. The apparatus also comprises at least one processing device comprising a processor coupled to a memory. The at least one processing device is configured to exchange, between the transceiver light plug and the computing device, at least one of (i) configuration information for one or more light-based indicators arranged on a front panel of a housing of the transceiver light plug and (ii) control information for controlling operation of the one or more light-based indicators arranged on the front panel of the housing of the transceiver light plug.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
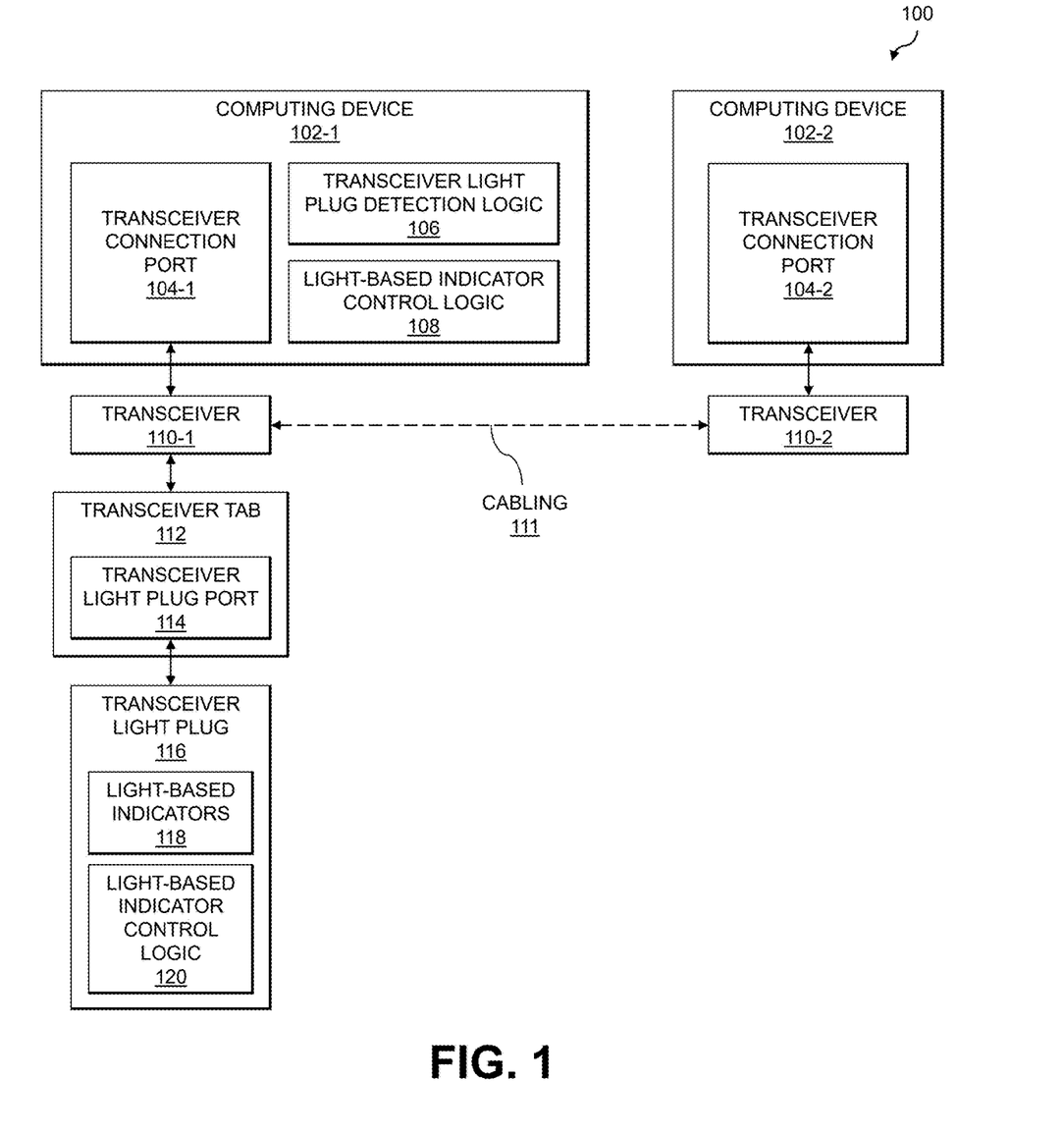
FIG. 1 is a block diagram of an information processing system configured for detection and control of light-based indicators of a transceiver light plug connected to a transceiver in an illustrative embodiment.

FIG. 1 shows an information processing system 100 configured in accordance with an illustrative embodiment. The information processing system 100 is assumed to be built on at least one processing platform and provides functionality for detection and control of light-based indicators of a transceiver light plug connected to a transceiver. The information processing system 100 includes computing devices 102-1 and 102-2 (collectively, computing devices 102) comprising respective transceiver connection ports 104-1 and 104-2 (collectively, transceiver connection ports 104) to which respective transceivers 110-1 and 110-2 (collectively, transceivers 110) are connected. The computing device 102-1 is connected to the computing device 102-2 via cabling 111 which connects the transceiver 110-1 and the transceiver 110-2. The cabling 111 may comprise direct attach copper (DAC), fiber or other cabling.

The computing devices 102 may comprise physical hardware devices such as servers, storage systems, networking equipment, Internet of Things (IoT) devices, other types of processing and computing devices including desktops, laptops, etc. In some embodiments, at least one of the computing devices 102 is a network device such as a switch, where the network device may include multiple transceiver connection ports, although only a single transceiver connection port is shown in FIG. 1 for each of the computing devices 102 for clarity of illustration.

In the information processing system 100, the transceiver 110-1 is coupled with a transceiver tab 112. The transceiver tab 112 may comprise a rigid plastic component which acts as push/pull tab facilitating insertion and removal of the transceiver 110-1 from the transceiver connection port 104-1. The transceiver tab 112 further includes a transceiver light plug (TLP) port 114, which allows for a TLP 116 to be removably attached to the transceiver tab 112. The TLP 116 includes a set of one or more light-based indicators 118 (e.g., light-emitting diodes (LEDs)). The transceiver tab 112 may be fixedly or removably coupled to the transceiver 110-1. The TLP port 114 may comprise a connector embodied as a set of sockets to which pins of the TLP 116 are inserted, as described in further detail below. The TLP 116 is removably coupled to the transceiver tab 112. When the TLP 116 is coupled to the transceiver tab 112, when the transceiver tab 112 is coupled to the transceiver 110-1, and when the transceiver 110-1 is plugged into the transceiver connection port 104-1, the light-based indicators 118 of the TLP 116 may be controlled by the computing device 102-1 utilizing TLP detection logic 106 and light-based indicator control logics 108 and 120. The TLP detection logic 106 is configured to detect when the TLP 116, the transceiver tab 112 and the transceiver 110-1 are connected to one another, and when the transceiver 110-1 is plugged in to the transceiver connection port 104-1. The light-based indicator control logics 108 and 120 are configured to drive the light-based indicators 118 to provide various information (e.g., port status, activity, etc.).

As the TLP 116 may be removably coupled to the transceiver 110-1 via the transceiver tab 112, the computing device 102-1 will only drive the light-based indicators 118 as-needed (e.g., when configuring a link between the computing device 102-1 and the computing device 102-2 via the transceiver connection ports 104 and transceivers 110). The TLP 116 can therefore be removed and used for multiple different transceivers plugged in to multiple different transceiver connection ports of the same or different computing devices at different times. Similarly, the transceiver tab 112, when embodied as a removable component, can be removed and used for different transceivers at different times.

In some embodiments, the computing devices 102 are part of an information technology (IT) infrastructure that is operated by an enterprise, organization or other entity. As used herein, the term "enterprise system" is intended to be construed broadly to include any group of systems or other computing devices. For example, the computing devices 102 of the IT infrastructure may provide a portion of one or more enterprise systems. A given enterprise system may also or alternatively include various other computing devices or other types of IT assets. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

Although not explicitly shown in FIG. 1, one or more input-output devices such as keyboards, displays or other types of input-output devices may be used to support one or more user interfaces to the computing devices 102, as well as to support communication between these elements and other related systems and devices not explicitly shown.

The computing devices 102 and other elements of the information processing system 100 in the FIG. 1 embodiment are assumed to be implemented using at least one processing device. Each such processing device generally comprises at least one processor and an associated memory, and implements one or more functional modules or logic for controlling certain features of the information processing system 100. In the FIG. 1 embodiment, for example, the computing device 102-1 is assumed to comprise a processor and a memory which implement TLP detection logic 106 and light-based indicator control logic 108. Similarly, the TLP 116 is assumed to comprise a processor and a memory which implement the light-based indicator control logic 120.

It is to be appreciated that the particular arrangement of the computing devices 102, the transceivers 110, the transceiver tab 112 and the TLP 116 illustrated in the FIG. 1 embodiment is presented by way of example only, and alternative arrangements can be used in other embodiments. As discussed above, for example, the transceiver tab 112 and/or TLP 116 may be removably coupled and connected with other transceivers such as transceiver 110-2.

The computing devices 102 and other portions of the system 100, as will be described in further detail below, may be part of cloud infrastructure.

The computing devices 102, the transceivers 110, the transceiver tab 112, the TLP 116 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The computing devices 102, the transceivers 110, the transceiver tab 112 and the TLP 116, or components thereof or other components of the information processing system 100 in the FIG. 1 embodiment, may be implemented on respective distinct processing platforms, although numerous other arrangements are possible. The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for computing devices 102, or portions or components thereof, to reside in different data centers. Numerous other distributed implementations are possible.

Additional examples of processing platforms utilized to implement components of the system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for detection and control of light-based indicators 118 of a TLP 116 connected to a transceiver 110-1 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Network devices, such as network switches, may include ports supporting a wide spectrum of data transfer speeds (e.g., 1G to 400G) to provide users with the widest possible range of connectivity options. "Super-Spine" network devices are further expected to see 800G-based deployments. Across product lines, the front panel of network switches or other network devices may include multiple light-emitting diodes (LEDs) or other light-based indicators, such as 4 or 8 LEDs per port. Such light-based indicators may be used to provide visual indicators for both status information (e.g., link up/down, speed, etc.) as well as activity of different ones of the ports. Visual indicator data from a network processing unit (NPU) Media Access Control (MAC)/Application-Specific Integrated Circuit (ASIC) is ingested to a complex programmable logic device (CPLD) for decoding and latching for driving the light-based indicators (e.g., LEDs) on the front panel of the network device which are associated with different ports. Such approaches, however, suffer from various technical problems.

LEDs and other light-based indicators may be used during initial cabling or during any subsequent port outage and/or port/cable maintenance activities. Compared to the "up" time of a network switch itself, the useful utilization time of the LEDs or other light-based indicators is insignificant except during these brief periods. Network device and other hardware vendors may spend a non-trivial amount of time and effort in designing the LEDs or other light-based indicators (e.g., both from a hardware/CPLD design as well as a software/microcontroller code development and testing perspective). Further, the front panel of network devices such as network switches may be finalized during an initial product design and cannot be changed. 400G and upcoming 800G compatible network ports have higher breakout port densities (e.g., ×8, ×16, etc.). In some designs, only a limited number of LEDs or other light-based indicators can be accommodated per network port. The LEDs or other light-based indicators are further competing for "real-estate" or space on the front panel of network devices. Removing the LEDs or other light-based indicators can provide better thermal performance and thereby support higher power optics.

Illustrative embodiments provide technical solutions which allow for removing LED or other light-based indicator hardware-specific components from network devices (e.g., network switches) or other IT assets into a transceiver light plug (TLP), which may also be referred to as a transceiver LED plug. The TLP can be plugged into a push/pull tab of a TLP-compatible transceiver only when necessary or desired. The network operating system (NOS) of the network device is only responsible for generating network port data for controlling the light-based indicators of the TLP, and the TLP behavior may be completely software-defined. Disaggregating the light-based indicators (e.g., LEDs) from the network device design will provide various technical benefits, including that LEDs or other light-based indicators are no longer required on the front panel of a network device. For example, on a 32-port one rack unit (1RU) switch, it is possible to eliminate 128 switchport LEDs (e.g., 4 LEDs for each of the 32 ports). The light-based indicators (e.g., switchport LEDs) need corresponding light pipes (e.g., that may be integrated with or be on a quad small form-factor pluggable double density (QSFP-DD) cage). Consequently, an equivalent number of light pipes can also be eliminated. Since a CPLD is no longer needed to decode and latch the light-based indicator data, it may be possible to eliminate or reduce corresponding CPLD resources. The removal of LEDs or other light-based indicators, as well as light pipes and possibly CPLDs, will advantageously result in less power and better cooling performance for network devices. Further, TLP design can evolve orthogonal to network device improvements, and reduces engineering and test efforts since the light-based indicators are now considered as software-defined functions from a NOS perspective. Removal of light-based indicators (e.g., LEDs) from a network device de-clutters the front panel of the network device and allows for better thermal performance. Further, the technical solutions provide improved capabilities for TLP-compatible transceivers.

Figure 2A:
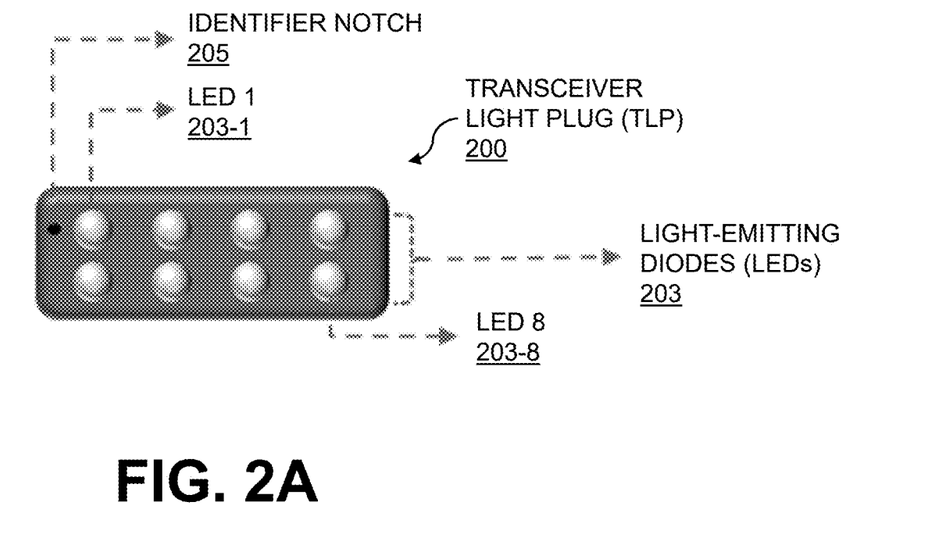
FIGS. 2A-2D show views of a transceiver light plug in an illustrative embodiment.
Figure 2B:
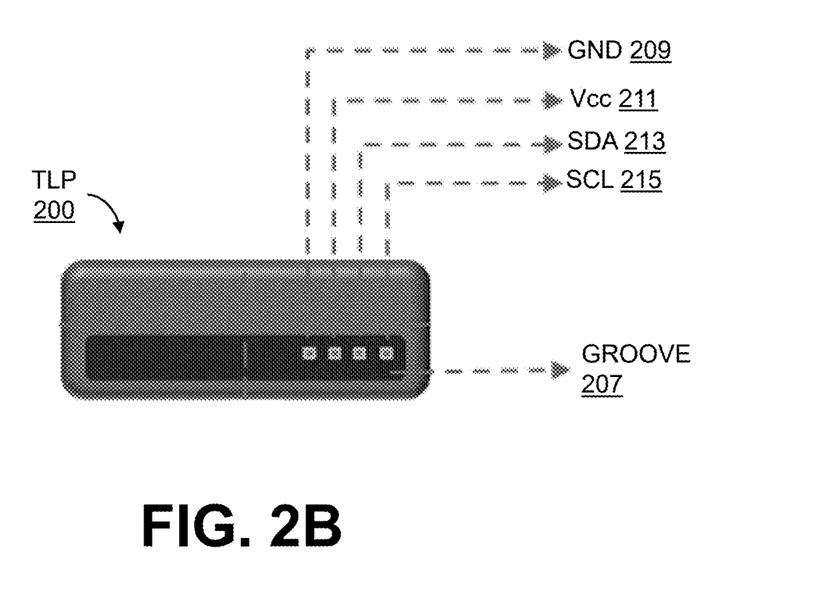
Figure 2C:
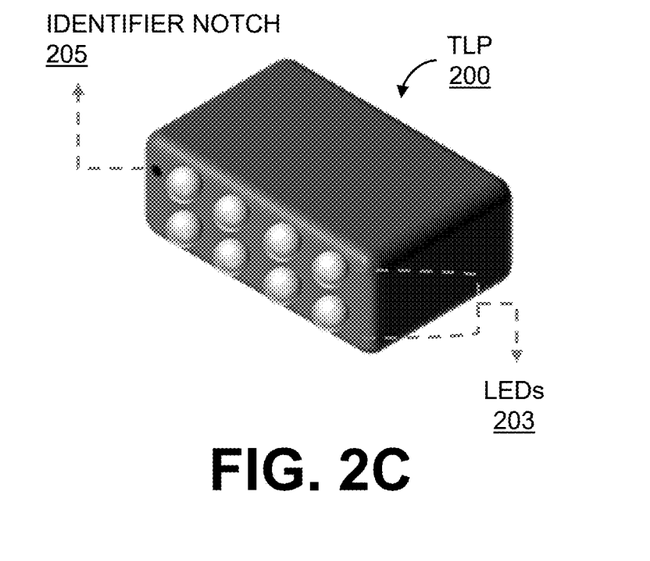
Figure 2D:
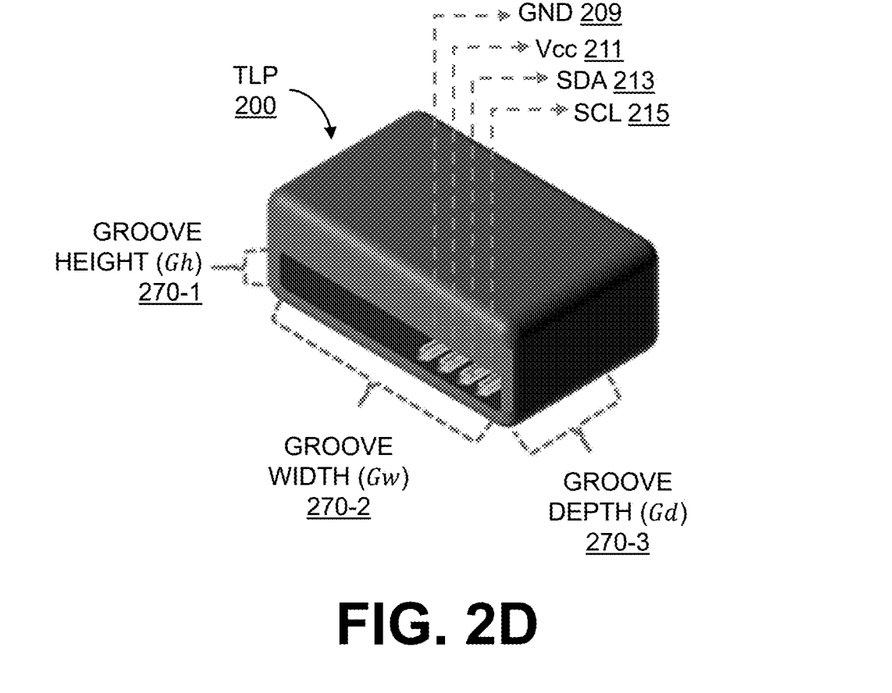

FIGS. 2A-2D show different views of a TLP 200. FIG. 2A shows a front view of the TLP 200, which is a cuboid module with rounded edges. The TLP 200 includes a set of LEDs 203 (including LED 1 203-1 through LED 8 203-8). The TLP 200 also includes an identifier notch 205 (e.g., proximate the upper left of the front of the TLP 200 next to LED 1 203-1). The identifier notch 205 may be used for assisting in orientation of the TLP 200 (e.g., through knowledge that the identifier notch 205 is next to LED 1 203-1). FIG. 2B shows a back view of the TLP 200, including a groove 207 with a set of pins, including a ground (GND) pin 209, a positive supply voltage (Vcc) pin 211, a serial data (SDA) pin 213 and a serial clock (SCL) pin 215. FIG. 2C shows a front isometric view of the TLP 200, and FIG. 2D shows a back isometric view of the TLP 200. As shown in FIG. 2D, the groove 207 has a groove height (Gh) 270-1, a groove width (Gw) 270-2 and a groove depth (Gd) 270-3. While in the example of FIGS. 2A-2D the TLP 200 includes eight LEDs 203 in two rows, this is not a requirement. A TLP may include any desired number of LEDs (e.g., 4 in one row, 4 in two rows of two, etc.). Further, the location of the identifier notch 205 may be placed at different locations (e.g., it may be placed next to LED 8 203-8 rather than next to LED 1 203-1). Further, the particular number and types of pins which are located in the groove 207 may vary.

Figure 3A:
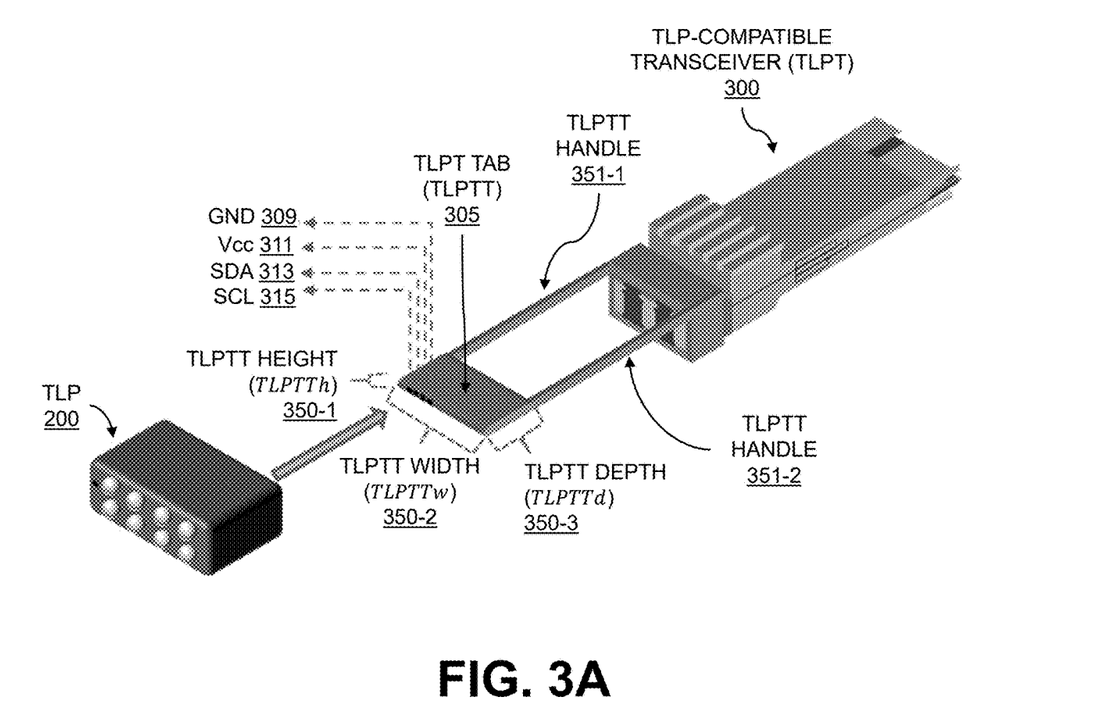
FIGS. 3A-3C show views of a transceiver light plug connected to transceivers configured for insertion into ports of a network switch in an illustrative embodiment.
Figure 3B:
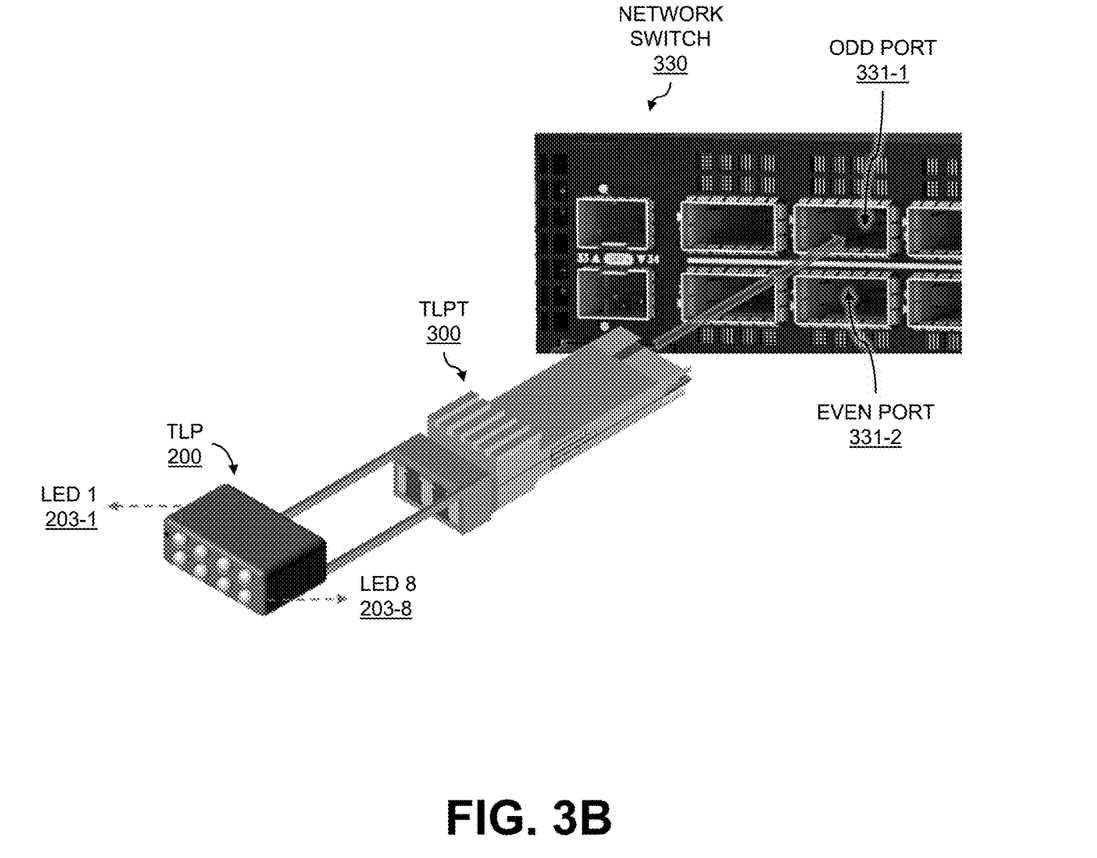
Figure 3C:
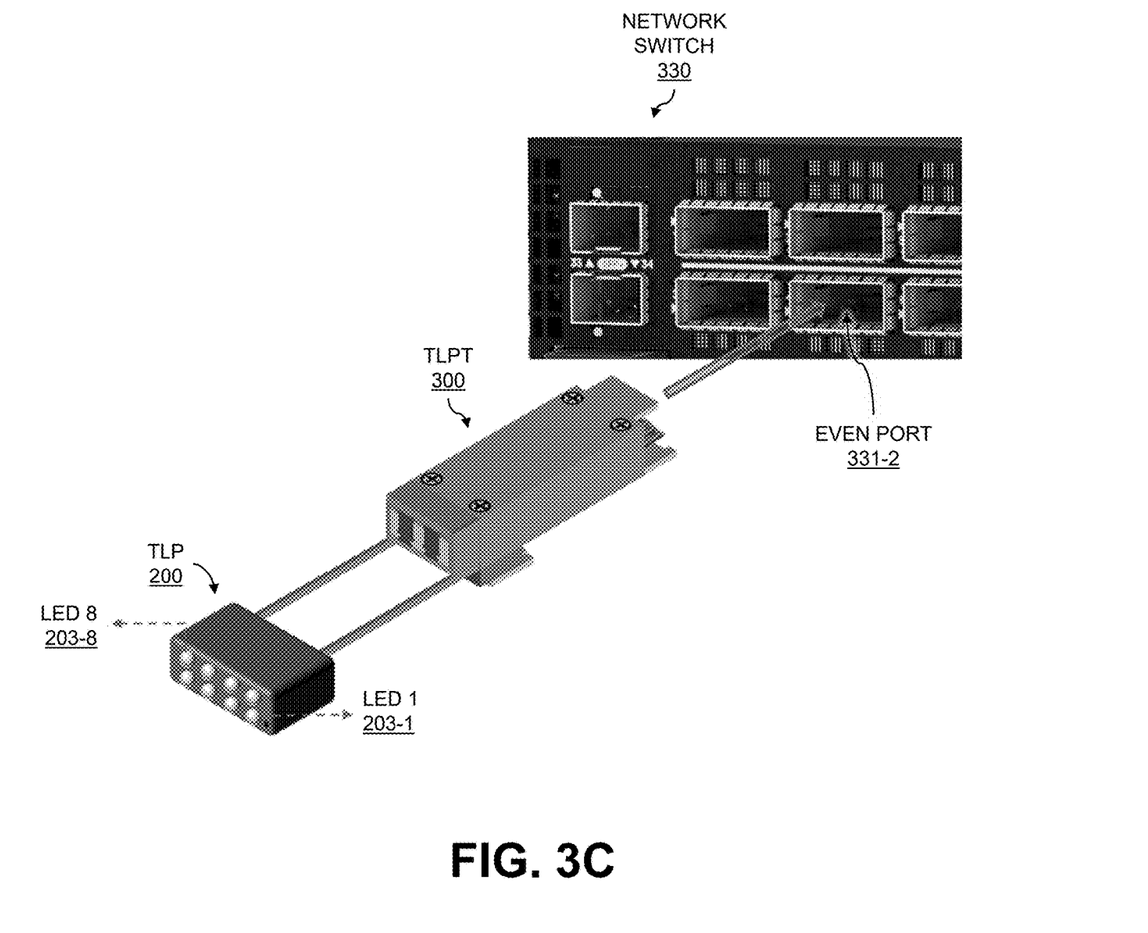

FIGS. 3A-3C illustrate connection of the TLP 200 into a TLP-compatible transceiver (TLPT) 300 including a TLPT tab (TLPTT) 305. As shown in FIG. 3A, the TLPT 300 is a push/pull tab-based transceiver with a 4-pin socket (e.g., including a GND socket 309, a Vcc socket 311, an SDA socket 313 and an SCL socket 315) on the left side to mate with the pins in the groove 207 of the TLP 200. The TLPTT 305 has a height (TLPTTh) 350-1, width (TLPTTw) 350-2 and depth (TLPTTd) 350-3, where TLPTTh=Gh+ε, TLPTTw=Gw+ε, and TLPTTd=Gd+ε. ε may be approximately 0.3 millimeters (mm) to ensure that the TLP 200 may be firmly plugged into the TLPTT 305. The TLPTT 305 also has handles 351-1 and 351-2 (collectively, TLPTT handles 351). The TLPTT handle 351-1 may be referred to as a "left" handle and the TLPTT handle 351-2 may be referred to as a "right" handle. Wiring may be routed through the TLPTT handles 351 for interconnecting the 4-pin socket with other portions (e.g., a circuit board) of the TLPT 300. The TLPTT 305 may be a push/pull tab that facilitates connection between the TLP 200 and the TLPT 300, and which facilitates insertion and removal of the TLPT 300 from transceiver ports. The TLPTT 305 may, in some embodiments, be formed of a polycarbonate material.

FIG. 3B shows the TLP 200 plugged in to the TLPTT 305, with the TLPT 300 being configured for insertion into an "odd" port 331-1 of a network switch 330, while FIG. 3C shows the TLP 200 plugged in to the TLPTT 305, with the TLPT 300 being configured for insertion into an "even" port 331-2 of the network switch 330. As per Open Network Install Environment (ONIE) convention, port numbering starts with "1" at the top left of a network device such as the network switch 330 (e.g., such that ports in the top row are "odd" ports while ports in the bottom row are "even" ports).

In the example of FIG. 3B the LED 1 203-1 of the TLP 200 is at the top left position, while in the example of FIG. 3B the LED 8 203-8 of the TLP is at the top left position. When the TLPT 300 with the attached TLP 200 is plugged into the "odd" port 331-1, since the groove 207 is in the bottom half of the TLP 200 (e.g., as shown in FIGS. 2B and 2D), the TLP 200 does not obstruct the fiber/digital-to-analog (DAC) cabling from the TLPT 300. In an ×8 breakout scenario, the NOS of the network switch 330 can map Lane 1 (a first breakout interface) to LED 1 203-1 of the TLP 200 and Lane 8 (a last breakout interface) to LED 8 203-8 of the TLP 200, which is in sync with the case where LEDs are present on a faceplate (e.g., a front plate) of the network switch 330. While FIG. 3B shows a scenario where the TLP 200 is first plugged in to the TLPTT 305, and then the TLPT 300 is inserted into the odd port 331-3 of the network switch 330, this is not a requirement. The TLPT 300 may first be inserted into the odd port 331-1 of the network switch 330, followed by plugging the TLP 200 into the TLPTT 305.

Figure 4:
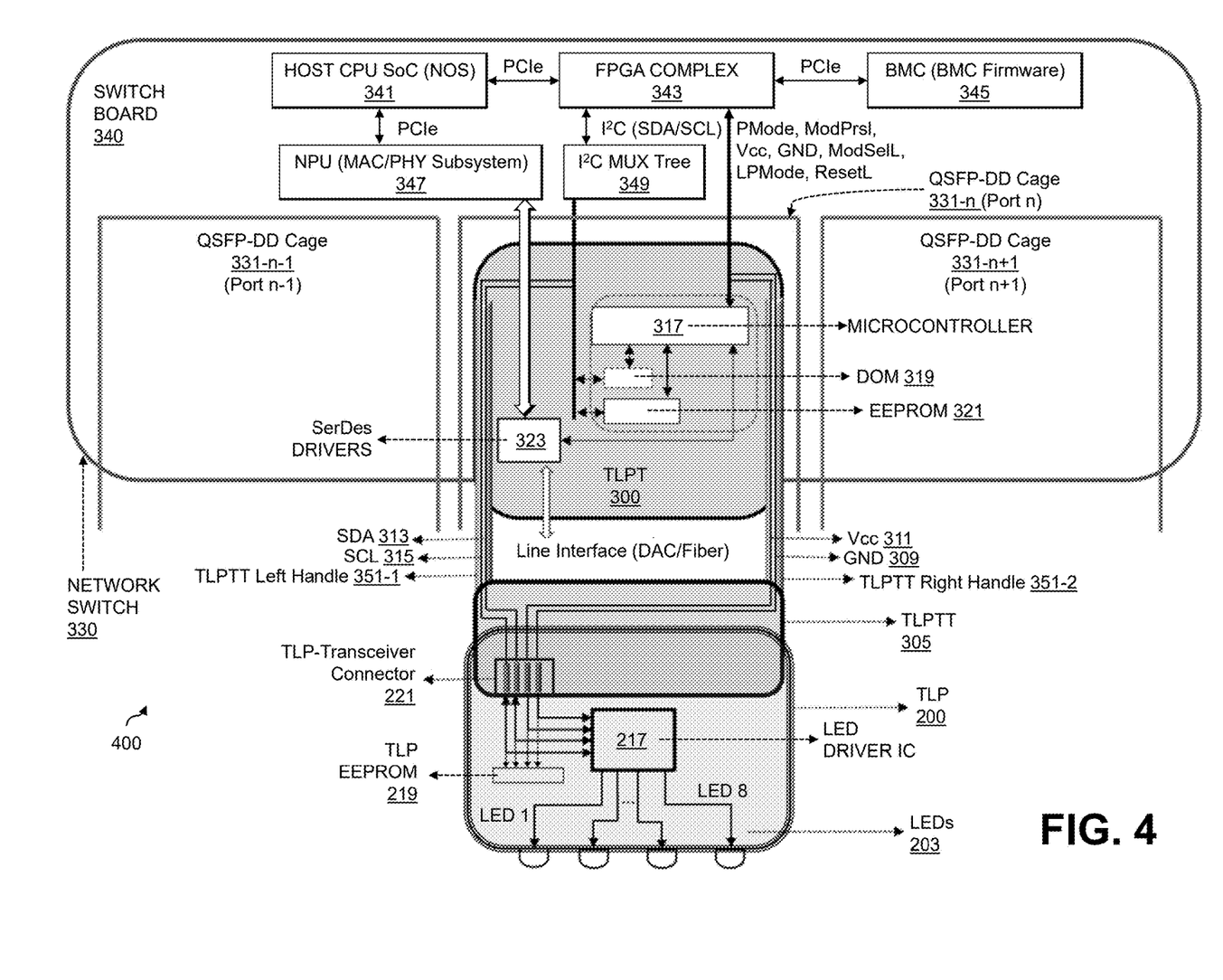
FIG. 4 shows a circuit diagram of a transceiver light plug connected to a transceiver inserted into a network port of a network switch in an illustrative embodiment.

FIG. 4 shows functional blocks and interfaces of a system 400 including the TLP 200 connected to TLPT 300, with the TLPT 300 being coupled to a Port n (QSFP-DD cage 331-n) of network switch 330. The network switch 330 includes multiple ports, of which three are shown including QSFP-DD cage 331-n−1 (Port n−1), QSFP-DD cage 331-n (Port n) and QSFP-DD cage 331-n+1 (Port n+1). The network switch 330 includes a switch board 340 including a host CPU system on a chip (SoC) 341 running a NOS for the network switch 330. The NOS may be, for example, a Software for Open Networking in the Cloud (SONiC) NOS, a Linux-based open NOS such as OS10, etc. The switch board 340 also includes a field-programmable gate array (FPGA) complex 343, a baseboard management controller (BMC) 345 running BMC firmware, a network processing unit (NPU) 347 running a MAC/PHY subsystem, and an inter-integrated circuit ($I^2C$) multiplexer (mux) tree 349. The FPGA complex 343 handles control plane signals to each port/transceiver, including the $I^2C$ mux tree 349 (SDA/SCL to each port), as well as other transceiver signals like power mode (PMode), module present (ModPrsL), module select (ModSelL), low power mode (LPMode), reset on low (ResetL), etc., apart from the positive supply voltage (Vcc) and ground (GND). The FPGA complex 343 may communicate with the host CPU SoC 341 and the BMC 345 over Peripheral Component Interconnect Express (PCIe) interfaces. Similarly, the host CPU SoC 341 and the NPU 347 may communicate over a PCIe interface. The NPU 347 runs a subsystem that drives the data plane and Serializer/Deserializer (SerDes) drivers 323 of the TLPT 300, and eventually the line interface (e.g., direct attach copper (DAC)/fiber).

The TLPT 300 is plugged into the Port n (QSFP-DD cage 331-n) of the network switch 330. The TLPT 300 includes a microcontroller 317, a digital optical monitoring (DOM) module 319, electrically erasable programmable read-only memory (EEPROM) 321, and the SerDes drivers 323. The DOM module 319 and EEPROM 321 are accessible over $I^2C$ (e.g., at address 0×50 and 0×51, respectively). The $I^2C$ signals from the TLPT 300 are extended over the TLPTT handle 351-1 to the SDA socket 313 and SCL socket 315 of the TLPTT 305. The GND and Vcc signals from the network switch 330 are extended over the TLPTT handle 351-2 to the GND socket 309 and the Vcc socket 311 of the TLPTT 305. The GND socket 309, Vcc socket 311, SDA socket 313 and SCL socket 315 are connected to the GND pin 209, Vcc pin 211, SDA pin 213 and SCL pin 215 of the TLP 200, which are represented collectively as TLP-transceiver connector 221 in FIG. 4.

The TLP 200 includes an LED driver integrated circuit (IC) 217 and a TLP-specific EEPROM 219. The TLP-specific EEPROM 219 (e.g., at address 0×70) is on the $I^2C$ bus, and the LED driver IC 217 (e.g., at address 0×75) acts as another $I^2C$ slave on the bus along with the TLPT 300's DOM module 319 and EEPROM 321. The LED driver IC 217 has internal pulse width modulation (PWM) control drivers for each of the LEDs 203 of the TLP 200.

Operation of the TLP 200 from the NOS will now be described. When the TLPT 300 with the TLP 200 connected thereto is inserted into the Port n (QSFP-DD cage 331-n) of the network switch 330, or when a TLP 200 is plugged into a TLPT 300 that is already inserted into the Port n (QSFP-DD cage 331-n) of the network switch 330, a software poller running as part of the NOS on the host CPU SoC 341 detects the TLP-specific EEPROM 219 and the TLP 200's LED driver IC 217 on the $I^2C$ bus. It should be noted that the TLPT 300 acts as an $I^2C$ passthrough for the NOS to access and program the TLP 200. The NOS reads the TLP-specific EEPROM 219 to determine the capabilities of the TLP 200, including power requirements, the number of LEDs 203 in the TLP 200, the capabilities of the LEDs 203, the capabilities of the LED driver IC 217, etc. Based on the power requirements of the TLP 200, the NOS may turn off Low Power (LP) mode, even though the transceiver may be Short Reach (SR). For example, it is expected that even in a LP mode, sufficient power will be delivered for driving the LEDs 203. If, however, the number of LEDs 203 is too much for the LP mode, the LP mode may be disabled temporarily while the TLP 200 is connected to the TLPT 300.

The NOS determines the port of the network switch 330 to which the TLPT 300 with attached TLP 200 is inserted. In the case of an "odd" port, the breakout interfaces 1 through 8 (corresponding to Lanes 1 through 8) are mapped to the LEDs 203 in order (e.g., from LED 1 203-1 to LED 8 203-8). In the case of an "even" port, the breakout interfaces 1 through 8 (corresponding to Lanes 1 through 8) are mapped to the LEDs 203 in reverse order (e.g., from LED 8 203-8 to LED 1 203-1). The NOS extracts the interface status and activity data (e.g., from the NPU 347 over the PCIe interface) corresponding to Port n (e.g., the port to which the TLPT 300 with attached TLP 200 is inserted), and periodically programs the interface state to mapped ones of the LEDs 203 of the the TLP 200. This may include, for example, setting ones of the LEDs 203 as on/off, setting ones of the LEDs 203 to specific colors, etc. This may also or alternatively include determining interface utilization and programming mapped ones of the LEDs 203 accordingly (e.g., setting a blink rate of one or more of the LEDs 203 using PWM drivers of the LED driver IC 217, setting colors of one or more of the LEDs 203, etc.). In some embodiments, it is anticipated that the TLP 200 is used sparingly (e.g., when needed for performing configuration operations, diagnosis and troubleshooting operations, etc.), the NOS may optionally log an alarm if a TLP 200 is plugged in to the TLPT 300 for more than some predetermined threshold period of time (e.g., T minutes).

Figure 5:
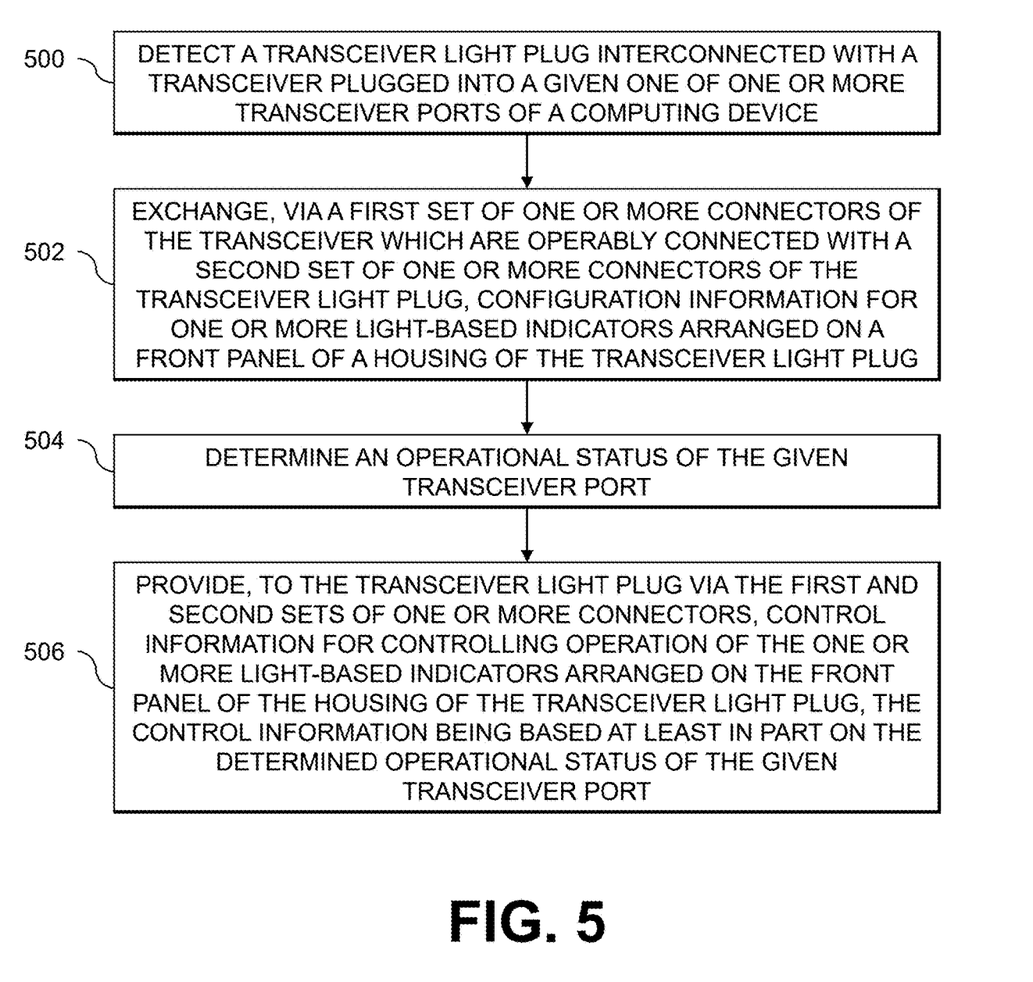
FIG. 5 is a flow diagram of an exemplary process for detection and control of light-based indicators of a transceiver light plug connected to a transceiver in an illustrative embodiment.

An exemplary process for detection and control of light-based indicators of a TLP connected to a transceiver will now be described in more detail with reference to the flow diagram of FIG. 5. It is to be understood that this particular process is only an example, and that additional or alternative processes for detection and control of light-based indicators of a TLP connected to a transceiver may be used in other embodiments.

In this embodiment, the process includes steps 500 through 506. These steps are assumed to be performed by the computing device 102-1 in the information processing system 100, which may be, for example, a network switch or other network device including one or more transceiver ports such as transceiver connection port 104-1 The process begins with step 500, detecting a TLP (e.g., TLP 116) interconnected with a transceiver (e.g., transceiver 110-1) plugged into a given one of the one or more transceiver ports (e.g., transceiver connection port 104-1). The TLP comprises a housing comprising a front panel and a rear panel opposite the front panel, where one or more light-based indicators are arranged on the front panel of the housing and a first set of one or more connectors are at the rear panel of the housing, the first set of one or more connectors being configured for operable interconnection with a second set of one or more connectors of a transceiver, the transceiver configured for insertion into the given transceiver port of the computing device. The light-based indicators being "arranged on" the front panel of the housing includes light-based indicators which are removably attached to the front panel of the housing, which are visible from the front panel of the housing but which are not attached to the front panel, etc. For example, the light-based indicators may be attached to a circuit board behind the front panel, with the front panel including holes through which the light-based indicators are visible. The one or more light-based indicators comprise one or more LEDs. The TLP may further include an identifier notch proximate a given one of the one or more light-based indicators. The rear panel of the housing of the TLP may comprise a groove, the first set of one or more connectors may comprise a set of pins, and the second set of one or more connectors may comprise a set of pin sockets, the groove being dimensioned for coupling the set of pins with the set of pin sockets on a tab of the transceiver. The set of pins comprises a ground (GND) pin, a positive supply voltage (Vcc) pin, a serial data (SDA) pin, and a serial clock (SCL) pin. The transceiver may comprise a tab coupled thereto, with the tab having the second set of one or more connectors configured for operable interconnection with the first set of one or more connectors of the TLP. The tab may comprise a push and pull tab facilitating insertion and removal of the transceiver from the transceiver port of the computing device. The tab may comprise a rigid material. The second set of one or more connectors may comprise a set of pin sockets, and the tab may comprise one or more tab handles interconnecting the tab and the transceiver, where one or more signal lines are routed from the set of pin sockets to the transceiver within at least one of the one or more tab handles.

In step 502, configuration information for one or more light-based indicators (e.g., light-based indicators 118) arranged on a front panel of a housing of the TLP is exchanged via a first set of one or more connectors of the transceiver which are operably connected with a second set of one or more connectors of the TLP (e.g., the TLP-transceiver connector 221). Step 502 may include generating a mapping of breakout interfaces to respective ones of the one or more light-based indicators, where the mapping of the breakout interfaces may be generated based at least in part on a location of the given transceiver port on the computing device (e.g., whether the port is an "odd" or "even" port).

In step 504, an operational status of the given transceiver port is determined. Control information is provided to the TLP via the first and second sets of one or more connectors in step 506. The control information is for controlling operation of the one or more light-based indicators arranged on the front panel of the housing of the transceiver light plug, the control information being based at least in part on the determined operational status of the given transceiver port. The control information may comprise controls for at least one of: turning on and off respective ones of the one or more light-based indicators; setting a color of respective ones of the one or more light-based indicators; and controlling a blink rate of respective ones of the one or more light-based indicators. The determined operational status may comprise an operation state of the transceiver plugged into the given transceiver port, a link state for a link established utilizing the transceiver plugged into the given transceiver port, link activity information for a link established utilizing the transceiver plugged into the given transceiver port, combinations thereof, etc.

The technical solutions described herein provide a TLP device, which may be embodied as a cuboid with rounded edges having a set of LEDs or other light-based indicators on a front panel thereof. The front panel of the TLP device may also include an identifier notch that is close to a given one of the LEDs or other light-based indicators, to assist in orienting the TLP device when attaching the TLP device to a TLP-compatible transceiver (a TLPT). The back of the TLP device includes a groove which accommodates a set of pins (e.g., for Vcc, GND, SDA, SCL, etc.). The groove has dimensions and polarization geometry which enables the TLP device to be plugged into a tab of a TLP-compatible transceiver, where the tab contains a mating connector including a set of sockets for connecting to the set of pins in the groove of the TLP device. The set of pins of the TLP device are routed internally to an LED or other light-based indicator driver IC which contains PWM drivers for each of the LEDs in the set of LEDs, such that when the TLP-compatible transceiver with the TLP connected thereto is plugged into a port of a network device (e.g., a switch port of a network switch), the TLP device's LED or other light-based indicator driver IC acts as a slave device in an $I^2C$ or other system bus of the TLP-compatible transceiver. The network device, having the port to which the TLP-compatible transceiver with the connected TLP is plugged in, controls the LEDs or other light-based indicators of the TLP based on the status, activity and interface breakout configuration of the LEDs or other light-based indicators of the TLP. The interface mapping may be swapped depending on whether the TLPT is plugged into an "odd" or an "even"

port of the network device, so as to maintain the same numbering configuration for the user with the interface breakout configuration.

The technical solutions therefore provide a TLP configured for connection to a TLP-compatible transceiver (e.g., a push/pull tab of the TLP-compatible transceiver), with software-defined and customizable control of LEDs or other light-based indicators of the TLP. The technical solutions thus advantageously allow for disaggregating LEDs or other light-based indicators from network devices (e.g., sets of LEDs or other light-based indicators which are associated with different ports of network devices). This democratizes the design of the LEDs or other light-based indicators, and reduces the hardware and software complexity of the network devices, enabling a network device vendor-independent reusable design which offers a higher level of flexibility, convenience and user experience. Apart from reducing necessary components on network devices (e.g., a CPLD, light pipes, LEDs or other light-based indicators, etc.), the technical solutions also help in reducing power consumption by improving air flow and thermal performance of the network devices. It should be noted that while various embodiments have been described with respect to use of TLPs with TLP-compatible transceivers which are plugged into transceiver ports of network switches, TLPs and TLP-compatible transceivers may be used for various other types of network devices and other IT assets having transceiver ports for which is it is desired to disaggregated light-based indicators therefrom.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for detection and control of light-based indicators of a TLP connected to a transceiver will now be described in greater detail with reference to FIGS. 6 and 7. Although described in the context of system 100, these platforms may also be used to implement at least portions of other information processing systems in other embodiments.

Figure 6:
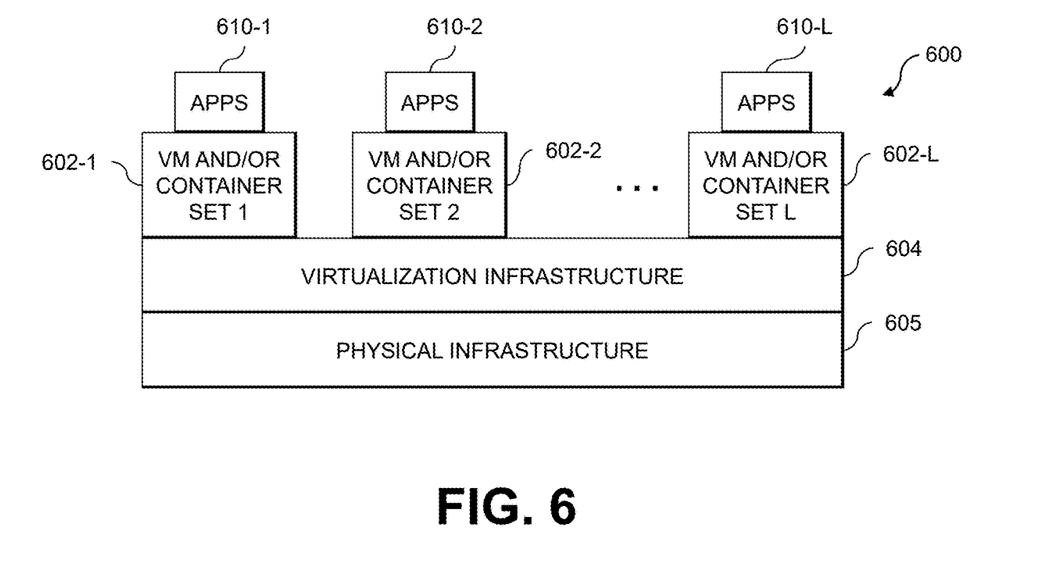
FIGS. 6 and 7 show examples of processing platforms that may be utilized to implement at least a portion of an information processing system in illustrative embodiments.
Figure 7:
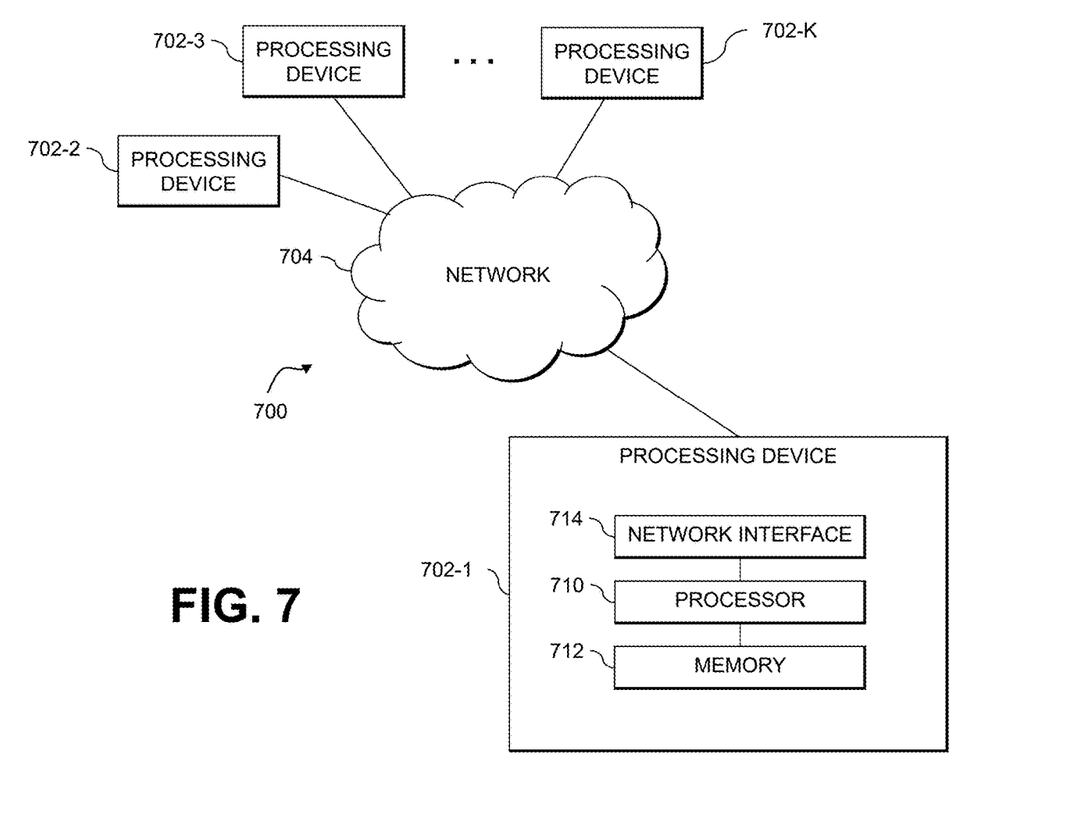

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for detection and control of light-based indicators of a TLP connected to a transceiver as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   one or more transceiver ports; and
   at least one processing device comprising a processor coupled to a memory;
   the at least one processing device being configured:
      to detect a transceiver light plug interconnected, at least in part via a transceiver light plug tab, with a transceiver plugged into a given one of the one or more transceiver ports;
      to exchange, via a first set of one or more connectors of the transceiver light plug tab which are operably connected with a second set of one or more connectors of the transceiver light plug, configuration information for one or more light-based indicators arranged on a front panel of a housing of the transceiver light plug;
      to determine an operational status of the given transceiver port;
      to provide, to the transceiver light plug via the first set of one or more connectors of the transceiver light plug tab that are operably connected with the second set of one or more connectors of the transceiver light plug, control information for controlling operation of the one or more light-based indicators arranged on the front panel of the housing of the transceiver light plug, the control information being based at least in part on the determined operational status of the given transceiver port.

2. The apparatus of claim 1 wherein exchanging the configuration information for the one or more light-based indicators arranged on the front panel of the housing of the transceiver light plug comprises generating a mapping of breakout interfaces to respective ones of the one or more light-based indicators.

3. The apparatus of claim 2 wherein the mapping of the breakout interfaces is generated based at least in part on a location of the given transceiver port on the apparatus.

4. The apparatus of claim 1 wherein the control information comprises controls for at least one of: turning on and off respective ones of the one or more light-based indicators; setting a color of respective ones of the one or more light-based indicators; and
   controlling a blink rate of respective ones of the one or more light-based indicators.

5. The apparatus of claim 1 wherein the determined operational status comprises an operation state of the transceiver plugged into the given transceiver port.

6. The apparatus of claim 1 wherein the determined operational status comprises a link state for a link established utilizing the transceiver plugged into the given transceiver port.

7. The apparatus of claim 1 wherein the determined operational status comprises link activity information for a link established utilizing the transceiver plugged into the given transceiver port.

8. An apparatus comprising:
   a housing comprising a front panel and a rear panel opposite the front panel;
   one or more light-based indicators arranged on the front panel of the housing;
   a first set of one or more connectors at the rear panel of the housing, the first set of one or more connectors being configured for operable interconnection with a second set of one or more connectors of a transceiver light plug tab configured for operable interconnection with a transceiver, the transceiver configured for insertion into a transceiver port of a computing device; and
   at least one processing device comprising a processor coupled to a memory;
   the at least one processing device being configured:
      to exchange, with the computing device via the first set of one or more connectors at the rear panel of the housing operably interconnected with the second set of one or more connectors of the transceiver light plug tab, configuration information for the one or more light-based indicators arranged on the front panel of the housing;
      to receive, from the computing device via the first set of one or more connectors at the rear panel of the housing operably interconnected with the second set of one or more connectors of the transceiver light plug tab, control information for controlling operation of the one or more light-based indicators arranged on the front panel of the housing, the control information being based at least in part on a determined operational status of the transceiver port of the computing device; and to control operation of the one or more light-based indicators arranged on the front panel of the housing based at least in part on the received control information.

9. The apparatus of claim 8 wherein the one or more light-based indicators comprise one or more light-emitting diodes.

10. The apparatus of claim 8 further comprising an identifier notch proximate a given one of the one or more light-based indicators.

11. The apparatus of claim 8 wherein the rear panel of the housing comprises a groove, wherein the first set of one or more connectors comprise a set of pins, and wherein the second set of one or more connectors comprise a set of pin sockets, the groove being dimensioned for coupling the set of pins with a set of pin sockets on the transceiver light plug tab.

12. The apparatus of claim 11 wherein the set of pins comprises a ground pin, a positive supply voltage pin, a serial data pin, and a serial clock pin.

13. The apparatus of claim 8 wherein exchanging the configuration information for the one or more light-based indicators arranged on the front panel of the housing comprises generating a mapping of breakout interfaces to respective ones of the one or more light-based indicators.

14. The apparatus of claim 13 wherein the mapping of the breakout interfaces is generated based at least in part on determining a location of the transceiver port on the computing device to which the transceiver is plugged in.

15. The apparatus of claim 8 wherein the control information comprises controls for at least one of: turning on and off respective ones of the one or more light-based indicators; setting a color of respective ones of the one or more light-based indicators; and
    controlling a blink rate of respective ones of the one or more light-based indicators.

16. An apparatus comprising:
    a transceiver configured for insertion into a transceiver port of a computing device;
    a transceiver light plug tab coupled to the transceiver, the transceiver light plug tab comprising a first set of one or more connectors, the first set of one or more connectors being configured for operable interconnection with a second set of one or more connectors of a transceiver light plug; and
    at least one processing device comprising a processor coupled to a memory;
    the at least one processing device being configured:
        to exchange, between the transceiver light plug and the computing device via the transceiver light plug tab configuration information for one or more light-based indicators arranged on a front panel of a housing of the transceiver light plug; and
        to provide, to the transceiver light plug via the transceiver light plug tab, control information for controlling operation of the one or more light-based indicators arranged on the front panel of the housing of the transceiver light plug.

17. The apparatus of claim 16 wherein the transceiver light plug tab comprises a push and pull tab facilitating insertion and removal of the transceiver from the transceiver port of the computing device.

18. The apparatus of claim 16 wherein the transceiver light plug tab comprises a rigid material.

19. The apparatus of claim 16 wherein the first set of one or more connectors comprise a set of pin sockets, wherein the second set of one or more connectors comprise a set of pins in a groove on a rear panel of the transceiver light plug.

20. The apparatus of claim 19 wherein the transceiver light plug tab comprises one or more tab handles interconnecting the transceiver light plug tab and the transceiver, wherein one or more signal lines are routed from the set of pin sockets to the transceiver within at least one of the one or more tab handles.

* * * * *